(12) United States Patent
Raget et al.

(10) Patent No.: US 11,508,240 B2
(45) Date of Patent: Nov. 22, 2022

(54) METHOD FOR IDENTIFYING SIRENS OF PRIORITY VEHICLES AND WARNING A HEARING-IMPAIRED DRIVER OF THE PRESENCE OF A PRIORITY VEHICLE

(71) Applicant: VITESCO TECHNOLOGIES GMBH, Hanover (DE)

(72) Inventors: Sébastien Raget, Toulouse (FR); Aurore Espinasse, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 0 days.

(21) Appl. No.: 17/280,759

(22) PCT Filed: Sep. 27, 2019

(86) PCT No.: PCT/EP2019/076193
§ 371 (c)(1),
(2) Date: Mar. 26, 2021

(87) PCT Pub. No.: WO2020/065014
PCT Pub. Date: Apr. 2, 2020

(65) Prior Publication Data
US 2021/0358300 A1    Nov. 18, 2021

(30) Foreign Application Priority Data
Sep. 27, 2018  (FR) ........................ 1858862

(51) Int. Cl.
*G08G 1/0965* (2006.01)
*B60Q 9/00* (2006.01)
(Continued)

(52) U.S. Cl.
CPC .......... *G08G 1/0965* (2013.01); *B60K 35/00* (2013.01); *B60Q 9/00* (2013.01); *G10L 25/18* (2013.01);
(Continued)

(58) Field of Classification Search
CPC ................ G08G 1/0965; B60K 35/00; B60K 2370/158; B60K 2370/178; B60Q 9/00; G10L 25/18; G10L 25/51; B60W 2420/54
See application file for complete search history.

(56) References Cited

U.S. PATENT DOCUMENTS

| 4,956,866 | A | | 9/1990 | Bernstein et al. | |
| 5,495,242 | A | * | 2/1996 | Kick | B60Q 9/008 340/902 |

(Continued)

FOREIGN PATENT DOCUMENTS

| DE | 102009041792 A1 * | 4/2010 | ........... G08G 1/0965 |
| DE | 102010022165 A1 * | 1/2011 | ........... G08G 1/0965 |

(Continued)

OTHER PUBLICATIONS

16th European Signal Processing Conference (EUSIPCO 2008), Lausanne, Switerlan. Aug. 25-29, 2008, copyright by EURASIP abstract titled, "A Real-Time Siren Detector to Improve Safety of Guide in Traffic Environment".*

(Continued)

*Primary Examiner* — Chico A Foxx
(74) *Attorney, Agent, or Firm* — Nixon & Vanderhye

(57) ABSTRACT

Disclosed is a device for identifying sirens of priority vehicles and for warning a hearing-impaired driver of a motor vehicle of a presence of at least one priority vehicle in an environment of his vehicle, including at least one sound receiver, a computing unit for analyzing the audio recording and a unit for comparing the frequencies of the audio recording with frequencies previously stored in storage of the computing unit as being associated with a siren of a given priority vehicle, and for doing so for each type of priority vehicle, and at least one visual and/or vibratory (Continued)

element for warning the driver when a presence of a priority vehicle is detected in an environment of the motor vehicle.

20 Claims, 1 Drawing Sheet

(51) Int. Cl.
*B60K 35/00* (2006.01)
*G10L 25/18* (2013.01)
*G10L 25/51* (2013.01)

(52) U.S. Cl.
CPC ........ *G10L 25/51* (2013.01); *B60K 2370/158* (2019.05); *B60K 2370/178* (2019.05); *B60W 2420/54* (2013.01)

(56) References Cited

U.S. PATENT DOCUMENTS

| | | | |
|---|---|---|---|
| 8,094,040 | B1 | 1/2012 | Cornett et al. |
| 10,205,428 | B1* | 2/2019 | Paepcke .................. B60Q 9/00 |
| 2003/0201906 | A1* | 10/2003 | Buscemi .............. G08G 1/0965 |
| | | | 340/902 |
| 2010/0033313 | A1* | 2/2010 | Keady .................. G08G 1/0965 |
| | | | 340/425.5 |
| 2011/0175755 | A1 | 7/2011 | Yoshioka et al. |
| 2011/0227756 | A1 | 9/2011 | Otero et al. |
| 2015/0304784 | A1* | 10/2015 | Snider .................... H04R 29/00 |
| | | | 381/56 |
| 2016/0112816 | A1* | 4/2016 | Kim ....................... G08G 1/167 |
| | | | 381/56 |
| 2017/0259737 | A1* | 9/2017 | Jang ........................ G08G 1/167 |
| 2017/0263126 | A1* | 9/2017 | Kim ........................ G08G 1/163 |
| 2018/0072222 | A1* | 3/2018 | Herbert .................. B60K 35/00 |

FOREIGN PATENT DOCUMENTS

| | | | | |
|---|---|---|---|---|
| JP | 2007050724 A | * | 3/2007 | |
| KR | 10-2004-0093283 | | 11/2004 | |
| KR | 20140019652 A | * | 2/2014 | ........ G08G 1/0965 |
| KR | 20150116924 A | * | 10/2015 | ........ G08G 1/0965 |
| WO | WO-2013125257 A1 | * | 8/2013 | ........ G10L 21/0232 |
| WO | 2016/196003 | | 12/2016 | |
| WO | 2018/157251 | | 9/2018 | |

OTHER PUBLICATIONS

Koichiro Tekeuchi, et al., "A Smart-Phone Based System to Detect Warning Sound for Hearing Impaired People", Image Analysis and Recognition; 11th International Conference, ICIAR 2014, vol. 8814, Jul. 9, 2014, 2 pages.
International Search Report and Written Opinion of the ISA for PCT/EP2019/076193 dated Oct. 31, 2019, 16 pages.

* cited by examiner dd
METHOD FOR IDENTIFYING SIRENS OF PRIORITY VEHICLES AND WARNING A HEARING-IMPAIRED DRIVER OF THE PRESENCE OF A PRIORITY VEHICLE This application is the U.S. national phase of International Application No. PCT/EP2019/076193 filed Sep. 27, 2019 which designated the U.S. and claims priority to FR Patent Application No. 1858862 filed Sep. 27, 2018, the entire contents of each of which are hereby incorporated by reference.

BACKGROUND OF THE INVENTION

Field of the Invention

The present invention relates to a method for identifying sirens of priority vehicles and for warning a hearing-impaired driver of a motor vehicle of a presence of a priority vehicle in an environment of the motor vehicle.

Since 3 Aug. 1959, the deaf and hearing-impaired have had the right to obtain a driving license and to drive a vehicle after obtaining such a license. However, to date, they only have few means for integrating external noises such as horns or acoustic warning signals, or the sirens of emergency vehicles, which are also called priority vehicles, into their driving.

Description of the Related Art

Document KR-A-2004/0093283 describes a method for recognizing the noises of motor-vehicle horns for a driver with a hearing impairment, such a driver being referred to as a hearing-impaired driver below. Such a method allows a direction to be detected and an acoustic signal such as that emitted by such a warning device to be converted into a tactile signal with a view to warning a hearing-impaired driver and enabling him to immediately respond to an emergency situation while driving.

In this method, provision is made to install a left microphone and a right microphone on the left and right sides of a motor vehicle with a view to detecting an acoustic source in both directions. The method includes a step of determining whether a warning signal having a level equal to or higher than a preset threshold value is present in the received audio recording.

If such is the case, it is determined from which direction the warning signal came. Next, the driver is informed that such a warning signal has been emitted and of its origin with respect to the right, left or middle of the motor vehicle of the hearing-impaired driver.

This document does not differentiate a warning signal originating from another motor vehicle from a priority-vehicle siren. However, it has been proven that a major cause of accidents is the presence of a priority vehicle being driven at high speed by a driver who thinks he has been recognized as such and expects others to move out of his way, which a hearing-impaired driver will find difficult to do quickly.

In contrast, a motor vehicle, unless it is being driven in an excessively racy and imprudent manner, will not attempt to force a way through or be traveling at excessively high speeds, and hence should represent less of a danger to the hearing-impaired driver.

Warning a hearing-impaired driver every time a motor-vehicle horn is actuated in the environment of his vehicle will only put him under pressure given that horns are often misused, i.e. used when there is no imminent danger, for example to indicate to a vehicle in front of the vehicle whose driver has used his horn to move off at a red light, which occurs frequently and for no good reason.

If a hearing-impaired driver is given too many tactile or visual warnings, he will begin to ignore such warnings. However, such tactile or visual warnings will always be apposite when it is a question of recognition of the presence of a priority vehicle in the environment of the motor vehicle of the hearing-impaired driver.

The problem behind the present invention is that of detecting the emission of a siren from at least one priority vehicle in the environment of a motor vehicle driven by a hearing-impaired person and of warning said person as rapidly as possible and as effectively as possible.

SUMMARY OF THE INVENTION

To this end, the present invention relates to a method for identifying sirens of priority vehicles and for warning a hearing-impaired driver of a motor vehicle of a presence of at least one priority vehicle in an environment of his motor vehicle, noteworthy in that it comprises a step of acquiring an audio recording of the environment, a step of analyzing the audio recording comprising comparing the frequencies acquired from the audio recording with frequencies previously stored as being associated with a siren of a given priority vehicle, and doing so for each type of priority vehicle, and, when it is detected that frequencies of a siren of a given priority vehicle are present in the audio recording, a step of warning the hearing-impaired driver that a priority vehicle is driving in the environment of his vehicle.

Until now, equipment for signaling to a hearing-impaired driver that a priority vehicle, such as a police car, fire truck or ambulance, with its external siren activated, is approaching has not existed. The present invention focuses on priority-vehicle sirens so as not to overburden the hearing-impaired driver with indications of the use of various horns of motor vehicles in the environment as these do not have the same urgency as priority-vehicle sirens.

The frequency-domain analysis is used to determine the presence of a danger signal emitted by a priority vehicle near the vehicle. The signal of the audio recording is sampled for digital processing. Once the signal has been sampled, the computing unit performs a decomposition into a Fourier series in order to identify the frequencies and amplitudes present in the recording. Following this, the computing unit searches for the presence of frequencies the amplitude of which is substantially higher than or equal to a preset threshold and that form part of the noteworthy frequencies. Each time a frequency is identified, it is stored in the control unit.

The stored sequence of frequencies is then compared with the reference patterns with a view to identifying the type of emergency vehicle present in proximity to the vehicle of the driver.

Advantageously, the acquired frequencies are taken into account only if their amplitude is higher than a minimum threshold. This allows the hearing-impaired driver to be warned only when the siren is emitted in proximity to his vehicle, so as not to divert his attention unnecessarily.

Advantageously, the warning step comprises emitting a light signal in a field of view of the hearing-impaired driver and/or generating vibrations of a unit of the motor vehicle that are transmitted to the hearing-impaired driver.

Advantageously, the light signal is emitted by one or more indicator lights or is displayed on an instrument panel or in the form of a text message displayed on a screen of an on-board computer of the motor vehicle and/or the vibrations affect the seat or the steering wheel of the hearing-impaired driver.

Advantageously, the warning step indicates the origin of the siren with respect to the vehicle and the type of priority vehicle associated with the detected siren.

Advantageously, the analyzing step takes into account at least one fundamental frequency of a given siren with at least its first five harmonics.

Advantageously, for each priority-vehicle siren, one or more fundamental frequencies specific to the siren are stored with an alternation and a number of cycles per minute of repetitions of the frequencies specific to the siren.

Advantageously, prior to the step of analyzing the audio recording, band-pass filtering with a pass band comprised between 400 Hz and 7 kHz of the audio recording is carried out.

The invention relates to a device for implementing a method for identifying sirens of priority vehicles and for warning a hearing-impaired driver of a motor vehicle of a presence of at least one priority vehicle in an environment of his vehicle, noteworthy in that the device comprises:
  at least one sound receiver,
  a computing unit with means for analyzing the audio recording and means for comparing the frequencies of the audio recording with frequencies previously stored in storage means of the computing unit as being associated with a siren of a given priority vehicle, and for doing so for each type of priority vehicle, and
  at least one visual and/or vibratory element for warning the driver when a presence of a priority vehicle is detected in an environment of the motor vehicle.

Advantageously, the device comprises at least two microphones arranged towards the right rear and the left rear of the motor vehicle, respectively, said at least one warning element comprising means for signaling an origin of the siren to the right rear or the left rear of the motor vehicle and as a consequence a location of the priority vehicle with respect to the motor vehicle of the hearing-impaired driver.

BRIEF DESCRIPTION OF THE DRAWINGS

Other features, aims and advantages of the present invention will become apparent from reading the detailed description that follows and from examining the appended drawings given by way of non-limiting examples, and in which.

DESCRIPTION OF THE PREFERRED EMBODIMENTS

Figure 1:
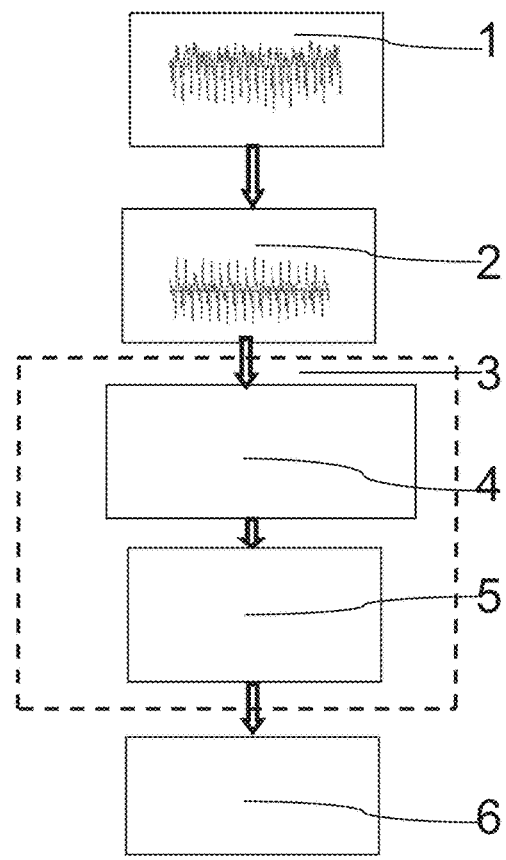
FIG. 1 is a schematic representation of a flowchart of the method according to the invention for identifying sirens of priority vehicles and for warning a hearing-impaired driver of a motor vehicle of a presence of at least one priority vehicle in an environment of his motor vehicle.

With particular reference to FIG. 1, the present invention relates to a method for identifying sirens of priority vehicles and for warning a hearing-impaired driver of a motor vehicle of a presence of at least one priority vehicle in an environment of his motor vehicle.

The method comprises a step 1 of acquiring an audio recording of the environment. This step is referenced 1 in FIG. 1 and is carried out using at least one sound receiver referenced 1a in FIG. 2. This acquiring step 1 is followed by a filtering step 2 which is not essential in the context of the present invention and which will be described in more detail below.

The next step is carried out in a computing unit 3 and consists of a step 4, 5 of analyzing the audio recording. This step 4, 5 of analyzing the audio recording is divided into a sub-step 4 of analyzing the audio recording spectrally with a view to identifying the noteworthy frequencies, and a sub-step 5 of comparing the frequencies acquired from the audio recording with frequencies previously stored as being associated with a siren of a given priority vehicle, and of doing so for each type of priority vehicle, these frequencies being referred to as fundamental frequencies.

These frequencies will have been stored in the computing unit 3 prior to its installation in the motor vehicle, but may be updated by download in case of changes to siren frequencies.

The following table gives, by way of nonlimiting example, a list of fundamental frequencies:

| Fundamental frequencies |
| --- |
| 420 ± 8 Hz |
| 435 ± 8 Hz |
| 488 ± 8 Hz |
| 516 ± 8 Hz |
| 580 ± 8 Hz |
| 651 ± 8 Hz |
| 732 ± 8 Hz |

The signal of a siren of a priority vehicle is characterized by the alternation of two or three fundamental frequencies. Each siren possesses a defined and standardized pattern:
  Ambulance 60 cycles/min: 420 Hz/516 Hz/420 Hz/silence 1.5 s
  Firemen 25 to 30 cycles/min: 435 Hz/488 Hz
  Gendarmerie 50 to 60 cycles/min: 435 Hz/732 Hz
  Police 50 to 60 cycles/min: 435 Hz/580 Hz The siren signal is made up of these fundamental frequencies and of their harmonics and other integer multiples of the fundamental frequency. Generally, it is possible to detect at most the $7^{th}$ harmonic, and therefore to determine at least the $5^{th}$ harmonic.

The comparison is made, on the one hand, between the one or more frequencies of each type of siren and, on the other hand, the frequencies acquired and extracted from the audio recording with a view to identifying whether one or more frequencies acquired and extracted from the audio recording are those of a siren of a given priority vehicle.

In the event of an alternation of frequencies in a siren signal of a given priority vehicle, it may also be checked whether this alternation of frequencies is present in the succession of frequencies extracted from the acquired audio signal. It is then possible to identify the exact type of priority or emergency vehicle that emitted the siren.

This comparison may be based on the fundamental frequencies and at least their first five harmonics.

When it is detected that frequencies of a siren of a given priority vehicle are present in the audio recording, a step 6 of warning the hearing-impaired driver that a priority vehicle is driving in the environment of his vehicle is carried out.

This will allow him to give way as quickly as a driver who actually heard the siren and will decrease the number of accidents, the priority vehicle not being forced to wait for a driver to give way.

To avoid false detections of siren signals or to avoid triggering unnecessary warnings, the following optional measures may be implemented.

The acquired frequencies may be taken into account only if their amplitude is higher than a minimum threshold, 93 decibels for example.

As mentioned above, the analyzing step 4, 5 takes into account at least one fundamental frequency of a given siren with at least its first five harmonics with a view to establishing a reliable comparison with previously stored siren fundamental frequencies and harmonics.

The one or more memorized siren frequencies may not be the only parameter of comparison with the acquired audio recording. An alternation of frequencies and a number of cycles per minute of repetitions of the frequencies specific to the siren may be stored.

Thus, it may not be enough for the audio recording to contain two frequencies typical of a stored siren for a warning to be sent to the driver, it then also being required that the extracted frequencies alternate in the order stored for said siren and/or according to the stored cycle.

In order to avoid noises giving rise to parasitic frequencies and to keep only the useful audio signal, prior to the step 4, 5 of analyzing the audio recording, band-pass filtering 2 with a pass band comprised between 400 Hz and 7 kHz may be carried out on the audio recording. The filter 2a may be a passive RLC filter or an active filter, these filters being well known to those skilled in the art.

The warning step 6 may indicate the origin of the siren with respect to the vehicle and the type of priority vehicle associated with the detected siren, i.e. whether the vehicle is coming mainly from the right rear or from the left rear with respect to the vehicle. Detection from in front of the vehicle is less essential, given that the hearing-impaired driver will be able to see the priority vehicle as it arrives.

However, it may be judicious to provide for lateral detection, for example at a right-angle intersection where lateral visibility is limited and the priority vehicle only identifiable by its siren.

Figure 2:
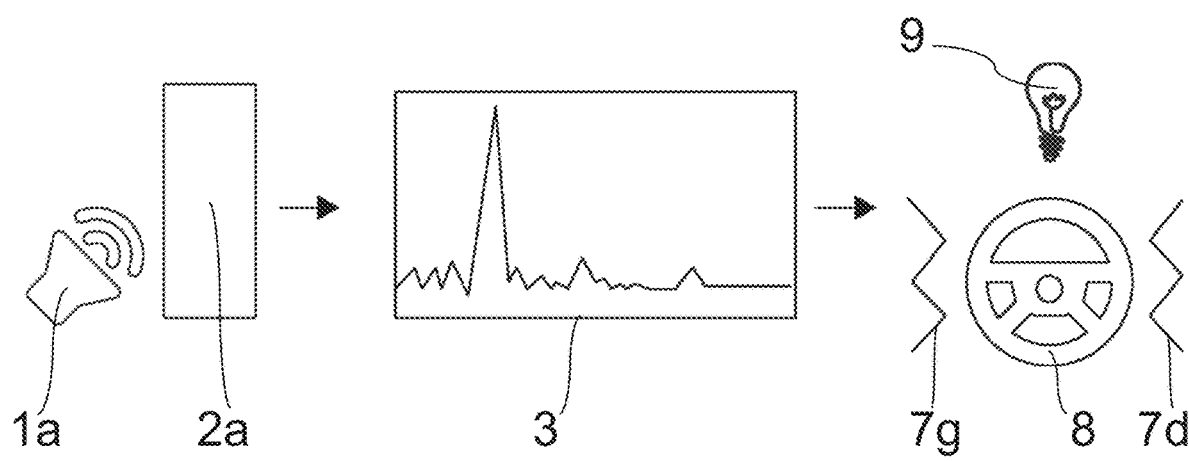
FIG. 2 is a schematic representation of the elements of a device for implementing the method according to the present invention, these elements being shown next to one another in positions different from those they occupy on or in the motor vehicle.

With reference to FIGS. 1 and 2, the invention relates to a device for implementing a method such as described above for identifying sirens of priority vehicles and for warning a hearing-impaired driver of a motor vehicle of a presence of at least one priority vehicle in an environment of his vehicle, this device being located on-board the motor vehicle.

The device comprises at least one sound receiver 1a, advantageously taking the form of at least one microphone, and a computing unit 3 with means for analyzing the audio recording and means for comparing the frequencies of the audio recording with frequencies previously stored in storage means of the computing unit 3 as being associated with a siren of a given priority vehicle, and for doing so for each type of priority vehicle.

The device also comprises at least one visual and/or vibratory element 9, 7g, 7d for warning the driver when a presence of a priority vehicle is detected in an environment of the motor vehicle.

The warning elements 9, 7g, 7d may have a number of aspects. The warning element or one of the warning elements may be able to emit a light signal in a field of view of the hearing-impaired driver.

Alternatively or in addition, the warning element or one of the warning elements 9, 7g, 7d may transmit vibrations from a unit 8 of the motor vehicle, said vibrations being transmitted to the hearing-impaired driver.

In FIG. 2, an indicator light 9 and vibrating means 7d and 7g are shown, d and g standing for the right and left of a motor-vehicle steering wheel 8, which is then the part of the motor vehicle made to vibrate.

This is non-limiting and the light signal may be emitted by one or more indicator lights or be displayed on an instrument panel using an icon or in the form of a text message displayed on a screen of an on-board computer of the motor vehicle.

Alternatively or in addition, the vibrating means may act on the seat instead of the steering wheel 8 of the hearing-impaired driver. The text message may also specify the type of priority vehicle approaching.

In one preferred embodiment, the device may comprise at least two microphones 1a by way of sound receivers, arranged towards the right rear and the left rear of the motor vehicle, respectively. The microphones 1a may be positioned on the vehicle between 0.5 and 1.5 meters from the ground.

In the case of a plurality of microphones 1a, it is advantageous for at least one warning element to comprise means 7d, 7g for signaling an origin of the siren to the right rear or the left rear of the motor vehicle and as a consequence a location of the priority vehicle with respect to the motor vehicle of the hearing-impaired driver.

This may be done by making the unit, the steering wheel 8 for example, vibrate only on the side from which the priority vehicle is coming, by means of vibrating means on the right 7d or left 7g of the steering wheel 8. Likewise, the displayed message may comprise the direction of origin of the priority vehicle and the warning icon on the instrument panel may be doubled on the right or left or be associated with a right or left arrow.

It is possible for the driver to put the device on standby, mainly to allow for a change of driver to one who is not hearing-impaired.

In a broader context, the present invention may be integrated into an autonomous vehicle, with the aim of integrating into such vehicles the incorporation of external sounds and danger signals due to the approach of priority vehicles into decision making.

The invention claimed is:

1. A method for identifying sirens of a plurality of priority vehicles and for warning a hearing-impaired driver of a motor vehicle of a presence of at least one priority vehicle of the plurality of priority vehicles in an environment of the motor vehicle, the method comprising:
   acquiring an audio recording of the environment;
   analyzing the audio recording comprising comparing the frequencies acquired from the audio recording with previously-stored frequencies associated with a siren of the at least one priority vehicle, for each type of the plurality of priority vehicles by taking into account at least one fundamental frequency of the siren with at least the first five harmonics of the at least one fundamental frequency; and
   warning the hearing-impaired driver that the at least one priority vehicle is driving in the environment of the motor vehicle when it is detected that frequencies of the siren of the at least one priority vehicle are present in the audio recording.

2. The method as claimed in claim 1, wherein the acquired frequencies are taken into account only when the amplitude of the acquired frequencies is higher than a minimum threshold.

3. The method as claimed in claim 2, wherein the warning comprises emitting a light signal in a field of view of the hearing-impaired driver.

4. The method as claimed in claim 2, wherein, for each siren of the plurality of priority vehicles, one or more fundamental frequencies specific to the respective siren are stored with an alternation and a number of cycles per minute of repetitions of the frequencies specific to the respective siren.

5. The method as claimed in claim 2, further comprising carrying out band-pass filtering with a pass band comprised between 400 Hz and 7 kHz on the audio recording before the analyzing.

6. The method as claimed in claim 1, wherein the warning comprises emitting a light signal in a field of view of the hearing-impaired driver.

7. The method as claimed in claim 6, wherein the light signal is emitted by one or more indicator lights.

8. The method as claimed in claim 7, wherein the warning indicates an origin of the siren with respect to the motor vehicle and the type of priority vehicle associated with the detected siren.

9. The method as claimed in claim 7, wherein, for each siren of the plurality of priority vehicles, one or more fundamental frequencies specific to the respective siren are stored with an alternation and a number of cycles per minute of repetitions of the frequencies specific to the respective siren.

10. The method as claimed in claim 6, wherein the warning indicates an origin of the siren with respect to the motor vehicle and the type of priority vehicle associated with the detected siren.

11. The method as claimed in claim 10, wherein, for each siren of the plurality of priority vehicles, one or more fundamental frequencies specific to the respective siren are stored with an alternation and a number of cycles per minute of repetitions of the frequencies specific to the respective siren.

12. The method as claimed in claim 6, wherein, for each siren of the plurality of priority vehicles, one or more fundamental frequencies specific to the respective siren are stored with an alternation and a number of cycles per minute of repetitions of the frequencies specific to the respective siren.

13. The method as claimed in claim 6, wherein the light signal is displayed on an instrument panel.

14. The method as claimed in claim 6, wherein the light signal is displayed as a text message displayed on a screen of an on-board computer of the motor vehicle.

15. The method as claimed in claim 1, wherein, for each siren of the plurality of priority vehicles, one or more fundamental frequencies specific to the respective siren are stored with an alternation and a number of cycles per minute of repetitions of the frequencies specific to the respective siren.

16. The method as claimed in claim 1, further comprising carrying out band-pass filtering with a pass band comprised between 400 Hz and 7 kHz on the audio recording before the analyzing.

17. The method as claimed in claim 1, wherein the warning comprises generating vibrations of a device of the motor vehicle that are transmitted to the hearing-impaired driver.

18. The method as claimed in claim 17, wherein the vibrations affect the seat or the steering wheel of the hearing-impaired driver.

19. A device for implementing a method for identifying sirens of a plurality of priority vehicles and for warning a hearing-impaired driver of a motor vehicle of a presence of at least one priority vehicle of the plurality of priority vehicles in an environment of the motor vehicle, the device comprising:

at least one sound receiver;

a computer comprising a storage configured to store a plurality of sets of frequencies each associated with a siren of a specific type of the plurality of priority vehicles, each of the plurality of sets of frequencies including at least two alternating frequencies, the computer being configured to analyze the audio recording, compare the frequencies of the audio recording with the stored sets of frequencies, and detect the presence of the at least one priority vehicle in the environment of the motor vehicle based on the comparison; and at least one visual and/or vibratory system configured to warn the driver when the presence of the at least one priority vehicle is detected in the environment of the motor vehicle.

20. The device as claimed in claim 19, further comprising at least two microphones disposed towards the right rear and the left rear of the motor vehicle, respectively, said at least one visual and/or vibratory system configured to signal an origin of the siren to the right rear or the left rear of the motor vehicle thereby signaling a location of the at least one priority vehicle with respect to the motor vehicle of the hearing-impaired driver.

* * * * *